UNITED STATES PATENT OFFICE.

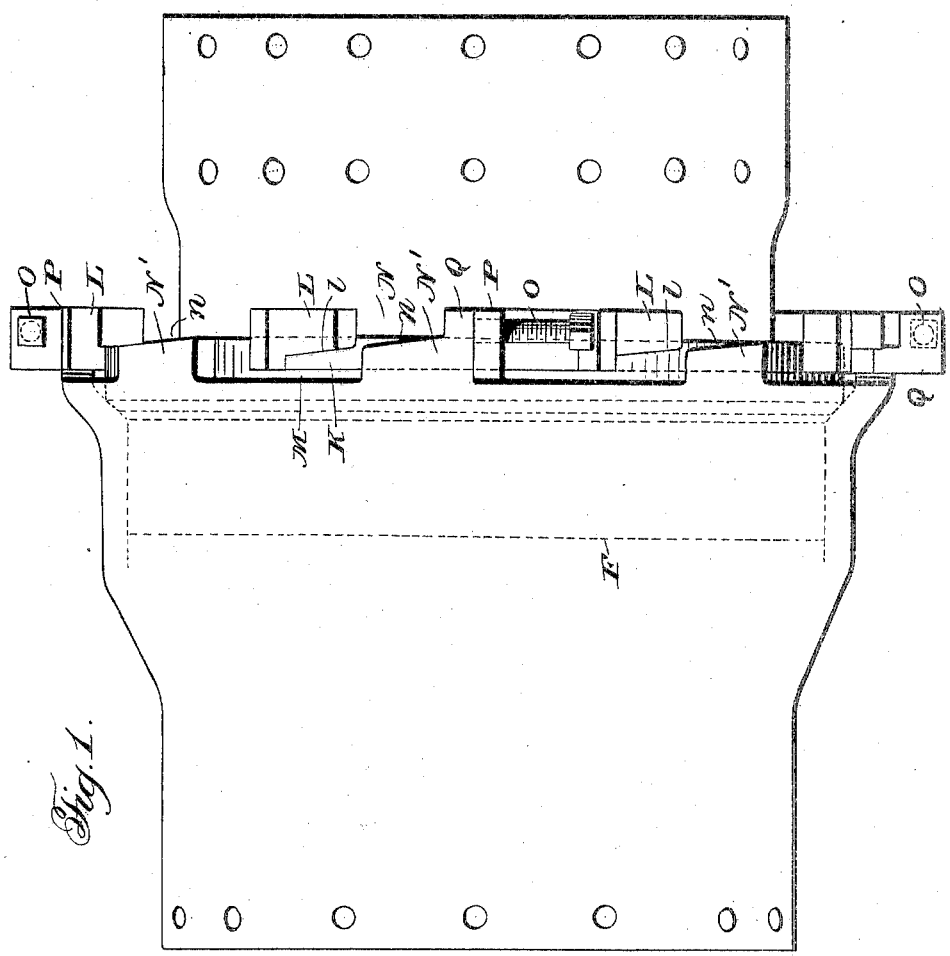

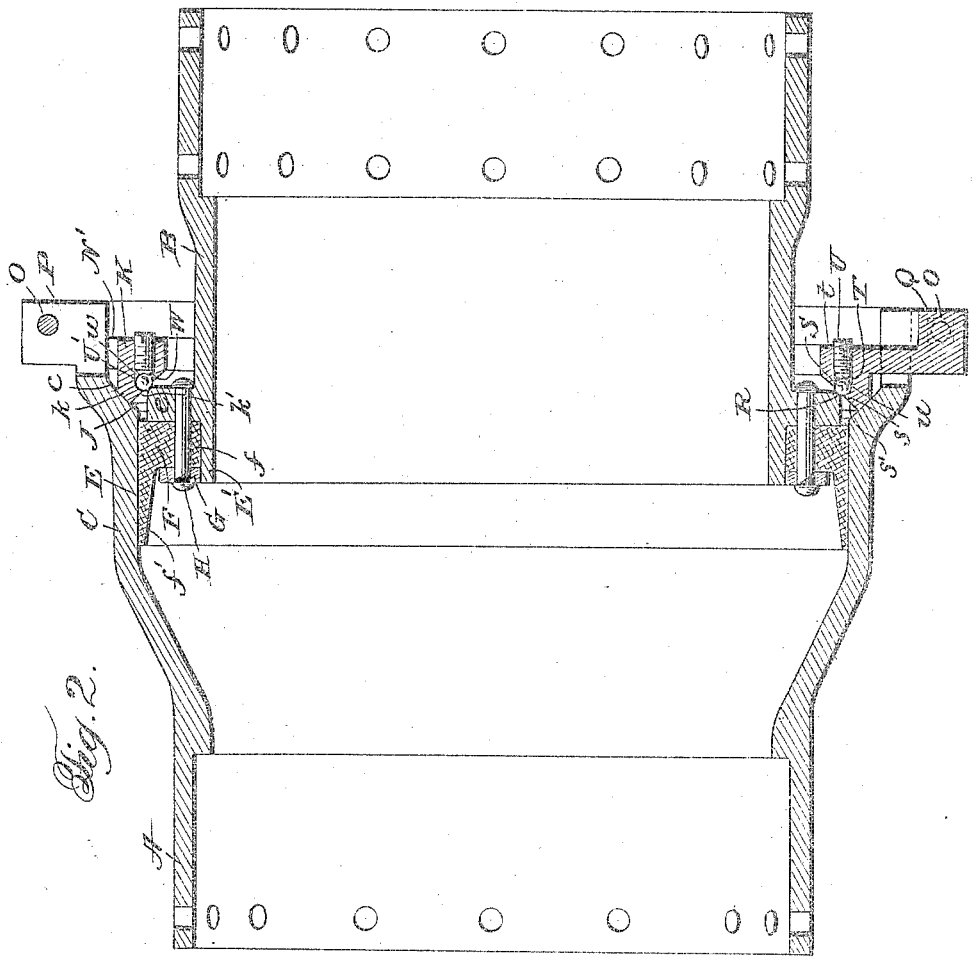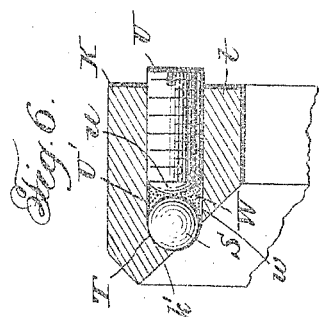

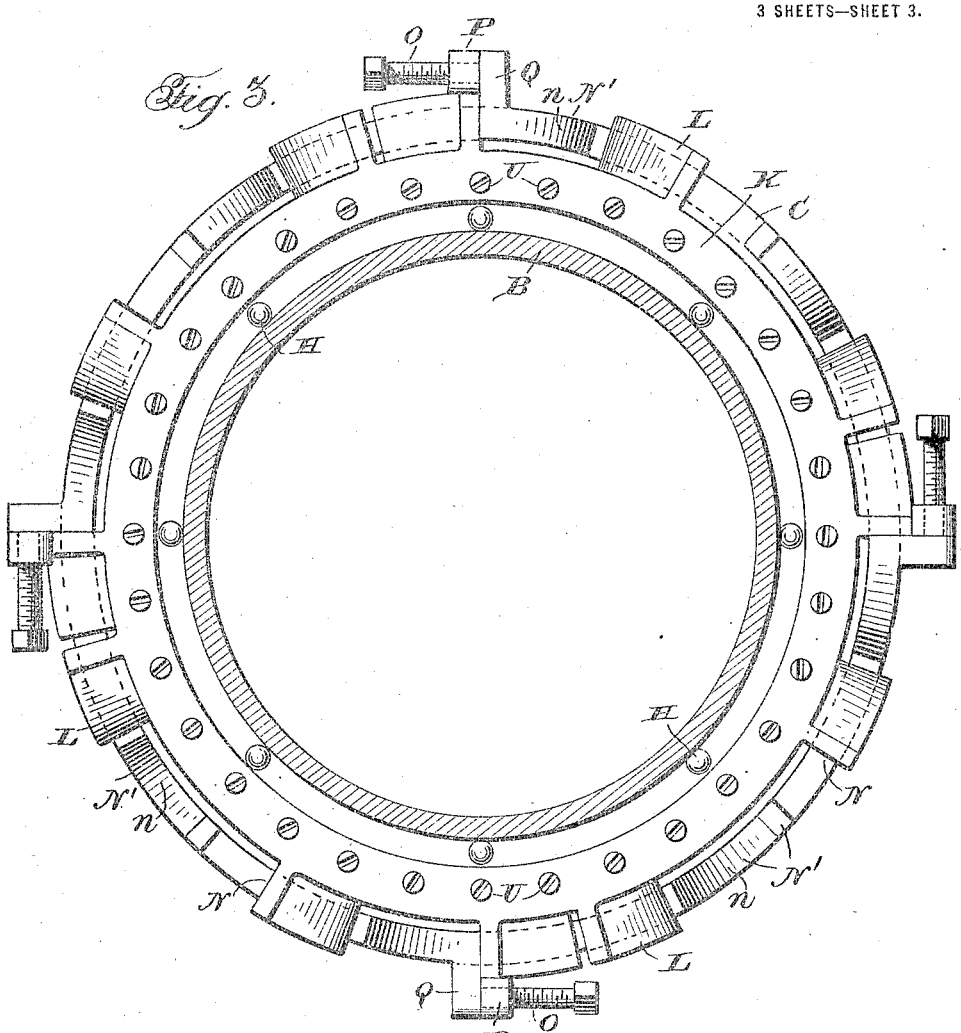

EDWARD F. BERRY, OF NEW ORLEANS, LOUISIANA.

FLEXIBLE PIPE-COUPLING.

1,291,376.  Specification of Letters Patent.  Patented Jan. 14, 1919.

Application filed November 8, 1917. Serial No. 200,992.

*To all whom it may concern:*

Be it known that I, EDWARD F. BERRY, a citizen of the United States, residing at New Orleans, in the parish of Orleans and State of Louisiana, have invented certain new and useful Improvements in Flexible Pipe-Couplings, of which the following is a specification, reference being had therein to the accompanying drawing.

This invention relates to improvements in flexible couplings for pipes and the like, which though capable of service in many connections is primarily intended for dredging pipe lines, now used principally on pontoons and where, as in other places of similar nature, a large flexible coupling is necessary.

The primary object of the invention is a provision of a coupling of the character stated wherein there may be a rocking or relative movement of the turning members when engaging each other, on an anti-friction bearing or surface to reduce the binding action between the parts and thus enable a more ready adjustment of the pipe line as a whole.

The invention also embraces improved means for locking the coupling members against separation, and for securing anti-friction bearings or surface in position relative to one of the coupling members to contact with and constitute an easy riding surface for the other coupling member when brought there against.

The invention also includes the association of a pair of coupling members with an interposed ball bearing or anti-friction ring having it anti-friction faces exposed for contact with the opposite or free coupling member, and permitting a riding of the latter on the anti-friction surfaces either during a relative rotated movement of the coupling members, or when one of the coupling members rocks laterally with reference to the other to secure any desired deflection of the pipe line necessitating corresponding self adjustment of the individual coupling members.

In the accompanying drawings forming a part hereof I have illustrated several embodiments of the invention with a view of employing a better understanding of the details and combinations of parts that will be understood by the persons skilled in this art that the invention is capable of such other forms and devices as may be comprehended by the terms of the hereinafter appended claims.

In the drawings:

Figure 1 is an elevation of the pipe coupling.

Fig. 2 is a longitudinal section.

Fig. 3 is a transverse section of Fig. 2.

Figs. 4 and 5 are a face view and a transverse sectional view respectively of a slightly modified form of ball-retaining means, and Fig. 6 is a detail sectional view on an enlarged scale.

Referring more specifically to the drawings wherein like reference characters refer to the same parts in the respective series of views, A represents what I may term the outer coupling member and B what I may term the inner coupling member of my improved flexible pipe coupling, it being understood that these members are formed of metal and are adapted to be riveted or fastened to suitable tubular pipe sections of any nature desired in the particular service for which the pipe line is intended, such pipe *per se* constituting no part of the present invention. The outer coupling member A is provided with an approximately bell shaped end portion C providing an elongated bearing surface E on the inside thereof parallel to the axis of the pipe line. The corresponding inner end E' of the coupling member B is slightly reduced to enter freely that of the bell-shaped portion C as shown and this reduced portion E' carries a packing member F having a thick base portion or ring $f$ and a free circular flexible tapering flange portion $f'$ adapted on its outer surface to bear upon the bearing surface on the bell-shaped member C, the base or ring portion $f$ being clamped between an integral flange $e$ on the reduced portion E' of the coupling member B to a loose adjustable ring G, a bolt or rivet H passing through the packing, flange $e$ and ring G to bind the packing in place. A long flexible flange $f'$ of the packing enables the coupling members to rock with reference to each other while at all times maintaining a sealing engagement, and the internal pressure exerted by the water, steam, air or oil on this flange will force the same into firm sealing with the bearing surface E.

Any suitable material may be employed for the packing just defined, as may be found expedient, for example in connection with cold water and air, rubber could be employed, for steam, a heat resisting material such as rubber, asbestos or cloth could be used and for oil, leather could be used.

The arrangement thus far described permits a telescopic movement of the two coupling members that is, the member B within the member A, to a considerable extent, as well as permitting the rocking or lateral deflecting movement of the one member with reference to the other permitted by the intervening space J between the reduced end portion E and bell-shaped portion C, but it is appreciated that the elongating or separating movement of the coupling members should be confined within reasonable limits and to this end a stop ring K is provided, the same having a beveled surface $k$ adapted to be wedged in place against a corresponding tapered or outwardly flaring surface $c$ on the bell-shaped portion C of the coupling member A. The width of the stop ring K is such that it abundantly overlaps as at $k'$, the flange $e$ on the reduced portion of the coupling member B so that when the locking ring K is in place said inner coupling member B cannot be withdrawn entirely from the coupling member A.

While it is desirable that the locking ring K shall, when in operative position, be firmly attached to the bell-shaped portion C of the coupling member A, yet there are occasions when this locking ring must be readily removable to permit the coupling members A and B to be separated as for example, when a new packing member F is to be supplied. To this end I form the terminal or marginal edge of the bell-shaped portion C with a series of circumferentially disposed lugs L having inwardly tapering inner surfaces $l$ adapted to constitute wedges there being spaces as at N beyond the point of each of the lugs L to permit the introduction of similar lugs N' peripherally extended from the locking ring K therein to any position to be forced behind the wedging surface $l$ the locking ring lugs N' having complemental wedging surfaces $n$. It will thus be seen that as the locking ring is inserted in the bell-shaped portion C of the coupling member A its wedged shaped lugs N' will enter the spaces N in the bell-shaped portion as to bring the locking lugs N' behind the complemental lugs L on the bell-shaped portion, when, by a rotative movement of the locking ring the wedge surfaces $l$ and $n$ will coöperate to bind the inclined faces $k$ of the locking ring $c$ of the bell-shaped portion C together and force the locking ring into fixed relation to the bell-shaped portion. To fasten the locking ring against accidental loosening or displacement and when necessary to force the wedge surfaces together other than by manual manipulation, I provide any desirable number of binding bolts O having threaded bearing in lugs P projecting peripherally from the terminal or marginal portion of the bell-shaped portion C with the inner ends of the bolts O arranged to engage similar projecting lugs Q on the locking ring K. With this arrangement, by turning up the clamping or binding bolts O the locking ring is forcibly turned with reference to the bell-shaped portion C and the parts secured in place with added firmness or rigidity as well as being fastened against accidental play or separation as stated.

In coupling members as large as these are at times, a vast amount of friction or binding action takes place between the packing and its seat or bearing, especially under the high pressures of the fluid being conveyed through the pipe line. This frictional resistance or binding is unduly augmented by the engagement of contacting surfaces on the interfitting coupling members where they abut at the extremity of their separating movement, rendering it in fact difficult at times to secure the desired lateral deflection of the coupling members. To overcome the frictional retardation at its last mentioned particular point and to correspondingly increase the freedom of action and facility for adjustment, I form the contacting edge of the lug $e$ smooth and rounded as at R to secure what would be termed a point contact between said rounded edge and anti-friction ball bearings S mounted in the locking ring K and projected through suitable apertures $s$ in the inner inclined face $s'$ of the locking ring sufficiently to bear upon said rounded edge R on the coupling member B. The balls S are retained in place by reason of the relatively small diameter of the apertures or openings $s$ to which I have just referred. For each ball S there is in the locking ring K a receiving pocket T opening through the outer surface $t$ of the locking ring and closed by a threaded plug U having a reduced rounded end $u$ adapted to bear with any degree of pressure desired on the ball S, the tapered end U' surrounding the rounded ball seat affording spaces $w$ in which a plastic lubricant or packing W may be inserted to lubricate and thereby assist smooth running of the balls S.

Referring now to the last two figures on Sheet 3 of the drawing, it will be seen that the balls in this instance represented at S' fit in closed bottom pockets T' and the locking ring K', the balls being held in place by a ring U² secured through the medium of screws X to the face of the locking ring K', the ring U² being provided with openings Y through which portions of the ball may protrude. The diameter of the binding being such as to preclude the escape of the balls or tapered spaces furnished between the balls and the locking ring K' and back of the ball retaining plate or ring U² affords a ready receiving channel for ample lubrication of the ball.

From the foregoing description it will be appreciated that, as herein first outlined, the members A and B may be telescoped together to reduce the length of the combined coupling while at the same time the members are capable of lateral deflection one with reference to the other to give any desired angularity to the coupling irrespective of the degree of telescoping or the position of the parts at the time, and when the couplings are in their maximum extended positions the two members may relatively rotate one on the other with their metallic parts in a smooth ball bearing contact, and when in this last mentioned condition the parts are laterally rocked.

The rocking is accomplished also on the ball bearing contact points as distinguished from frictionally resisting harsh opposing metal surfaces.

What I claim is:

1. A coupling of the character described, comprising coupling members one fitting within the other, and having portions adapted to constitute a stop for limiting the relative endwise movement of the members in combination with spaced anti-friction devices formed in one of said portions and projected therefrom to be in part interposed between said portions to afford a rolling contact therebetween.

2. A flexible coupling of the character described comprising a pair of interfitting members capable of telescopic adjustment, stop portions on said members for limiting the relative adjustment thereof, and spaced anti-friction devices formed in one of said portions and projected therefrom to be in part interposed between said stop portions to afford a rolling contact therebetween, substantially as described.

3. A flexible coupling of the character described, comprising a pair of interfitting members capable of telescopic adjustment, stop portions on said members for limiting the relative adjustment thereof, and spaced anti-friction devices formed in one of said portions and projected therefrom to be in part interposed between said stop portions to afford a rolling contact therebetween, said members being formed and related to permit relative lateral deflection also on said anti-friction devices, substantially as described.

4. A coupling of the character described, comprising interfitting members formed for relative rotative and lateral deflecting movements, and spaced anti-friction devices through which the members may have rolling contact in their said lateral movements, said anti-friction devices being fixed to and carried by one of said members.

5. A coupling of the character described, comprising interfitting members formed for relative rotative and lateral deflecting movements, and spaced anti-friction devices through which the members may have rolling contact in their said lateral movements, said devices also constituting the contacting element between the members when the parts have their rotative movement, said anti-friction devices being fixed to and carried by one of said members.

6. A coupling of the character described, comprising interfitting members one capable of lateral deflection with reference to the other, and spaced anti-friction devices constituting a rolling engagement between the two members on which the one member may rock with reference to the other, said anti-friction devices being fixed to and carried by one of said members.

7. A coupling of the character described, comprising interfitting members, a stop ring on one of the members adapted to be engaged by the other member to limit the movement thereof, and spaced anti-friction bearings carried by said stop ring and partially projecting therefrom to be engaged by said member.

8. A coupling of the character described, comprising interfitting members, the outer member having an internally disposed wedging surface and a stop ring for the outer member for limiting the movement of the inner member, said stop ring having a complemental wedging surface and means for wedging the stop ring into position on the outer member.

9. A coupling of the character described, comprising interfitting members, and a stop ring for the outer member for limiting the movement of the other member, and means for wedging the stop ring into position on the outer member, said means comprising interfitting tapered lugs on the ring projected outwardly peripherally thereof, and on the outer member projected endwise thereof arranged in opposing relation and adapted to bind upon relative turning movement.

10. A coupling of the character described, comprising interfitting members and a stop ring for the outer member for limiting the movement of the other member, and means for wedging the stop ring into position on the outer member, said means comprising interfitting tapered lugs on the ring projected outwardly peripherally thereof, and on the outer member projected endwise thereof, arranged in opposing relation and adapted to bind upon relative turning movement, in combination with a locking bolt on a radial extension of one of the rotative parts adapted to impinge upon a corresponding extension of the other.

11. A coupling of the character described, comprising interfitting members and means for limiting the movement of one of the members with reference to the other including a detachable locking ring on one of the members adapted to confine a part on the other member, the detachable connection for said ring including inter-engaging tapered parts adapted by relative rotative movement to bind the ring in place, some of said parts being projected peripherally and others longitudinally with reference to the members to permit the said interfitting thereof.

12. A coupling of the character described, comprising interfitting members and means for limiting the movement of one of the members with reference to the other including a detachable locking ring on one of the members adapted to confine a part on the other member, the detachable connection for said ring including inter-engaging tapered parts adapted by relative rotative movement to bind the ring in place, some of said parts being projected peripherally and others longitudinally with reference to the members to permit the said interfitting thereof, in combination with means for forcibly securing said rotative clamping movement consisting of opposed extensions and means for forcing them apart.

13. In a device of the character described, opposing members, an interposed ball-carrying portion, and means for removably securing the balls in place comprising individual receiving pockets, and separate retaining means engaging the balls to hold them in their pockets and leaving intervening spaces between the same and the balls for a lubricant, substantially as described.

14. In a device of the character described, opposing members, an interposed ball-bearing portion, and means for removably securing the balls in place comprising individual receiving pockets, and retaining means engaging the balls to hold them in their pockets comprising threaded bolts having ball seats in their ends, said ends being reduced relative to the body of the bolts substantially as described.

In testimony whereof I hereunto affix my signature in the presence of two witnesses.

EDWARD F. BERRY.

Witnesses:
 FRED SOLIS,
 M. ORRELL.

Copies of this patent may be obtained for five cents each, by addressing the "Commissioner of Patents, Washington, D. C."